March 21, 1944.  E. C. McDANIEL  2,344,921
TRAILER STABILIZER
Filed May 11, 1942  2 Sheets-Sheet 1
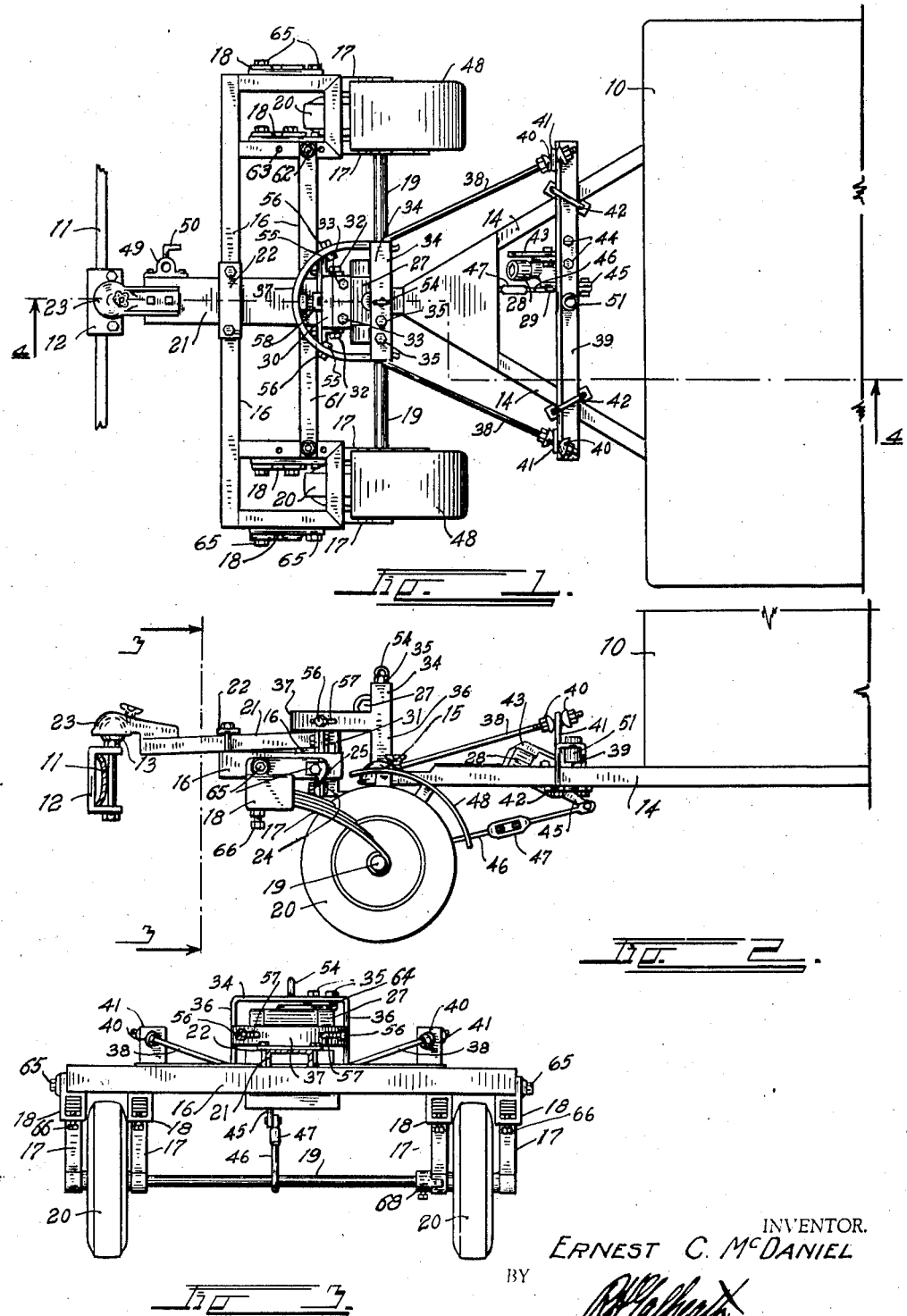
INVENTOR.
ERNEST C. McDANIEL
BY
ATTORNEY.

March 21, 1944.  E. C. McDANIEL  2,344,921
TRAILER STABILIZER
Filed May 11, 1942   2 Sheets-Sheet 2
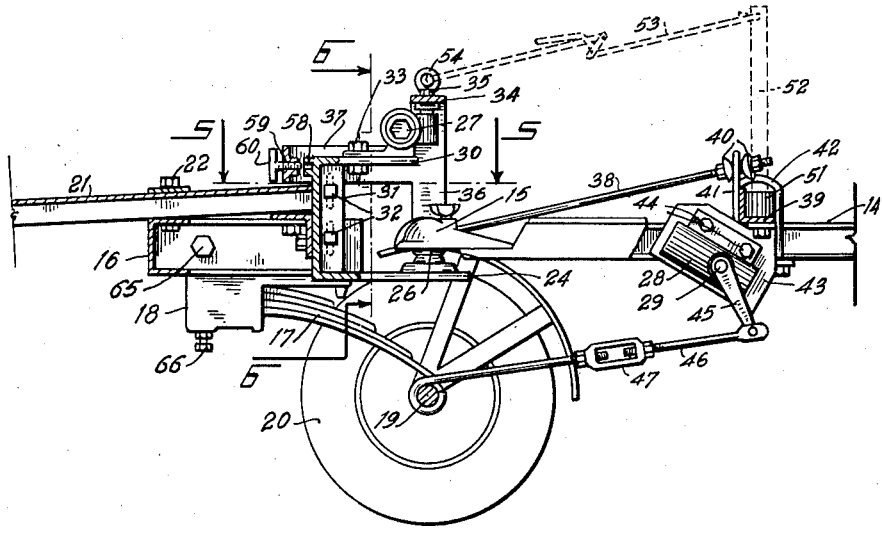
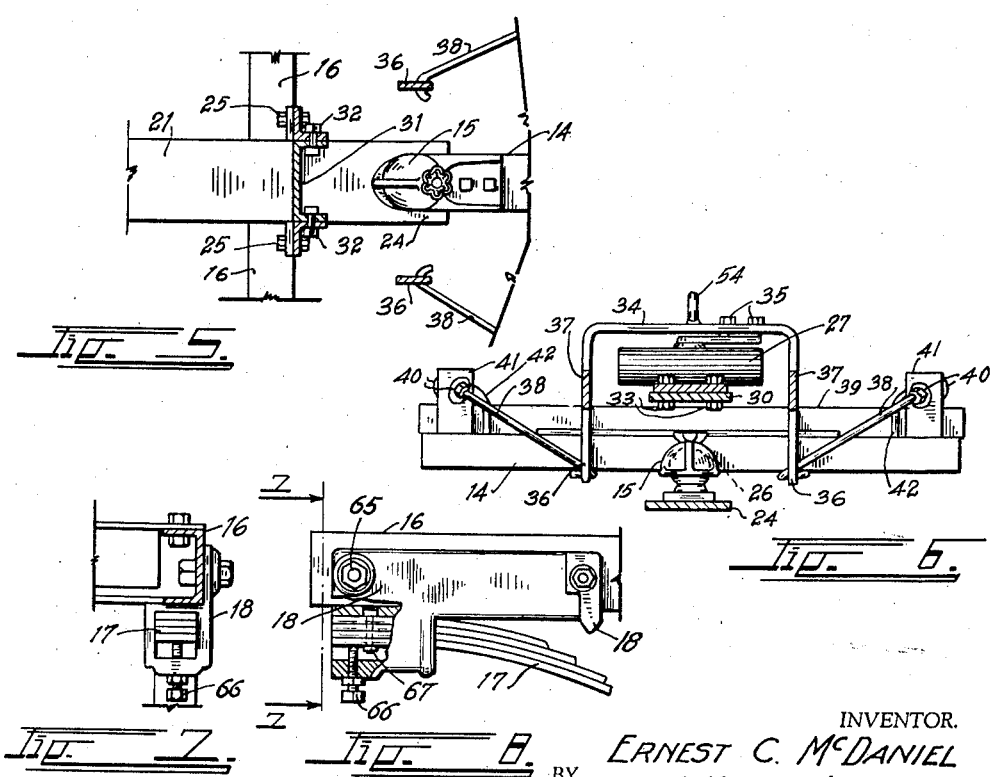
INVENTOR.
ERNEST C. McDANIEL
BY
ATTORNEY Patented Mar. 21, 1944

2,344,921

UNITED STATES PATENT OFFICE 2,344,921

TRAILER STABILIZER

Ernest C. McDaniel, Denver, Colo.

Application May 11, 1942, Serial No. 442,527

10 Claims. (Cl. 280—33.4)

This invention relates to a device for hitching a trailer to a towing vehicle and more particularly to a sway absorbing mechanism for trailer hitches.

It is customary when hauling exceedingly heavy trailers to rest the tongue or forward extremity of the trailer on a wheeled dolly which in turn is connected to the tow car. These dollies have not been satisfactory for high speed hauling due to the fact that the forward extremity of the trailer will oscillate horizontally imparting a whipping or swinging action to the dolly which, if not checked, will throw the trailer or the dolly from the road. While the horizontal whipping action is the most dangerous, a vertical whipping or pitching action will also be imparted which results in bouncing the dolly from the road and aggravating the horizontal swinging or whipping thereof.

The principal object of this invention is to provide means which will damper and, in most cases, eliminate all horizontal and vertical oscillating, whipping, or pitching of the trailer and towing dolly so that it will be impossible for the oscillations to build up or increase to a dangerous point.

Other objects of the invention are to provide means whereby the dolly can be locked to the tow car to facilitate backing and maneuvering the trailer; and to provide efficient means for supporting the dolly when the tow car is detached therefrom.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved sway-absorbing trailer dolly as it would appear in use;

Fig. 2 is a side view thereof;

Fig. 3 is a cross section, taken on the line 3—3, Fig. 2;

Fig. 4 is an enlarged, longitudinal section, taken on the line 4—4, Fig. 1;

Fig. 5 is a detail, fragmentary section, taken on the line 5—5, Fig. 4;

Fig. 6 is a similar section, taken on the line 6—6, Fig. 4;

Fig. 7 is a detail fragmentary sectional view, taken on the line 7—7, Fig. 8, illustrating the type of spring clamp employed in the invention; and Fig. 8 is a fragmentary end view of the dolly frame illustrating the spring clamp thereon partially broken away to reveal the interior construction.

A typical trailer of any type or design is indicated at 10 and the towing vehicle is indicated on the drawings by the fragmentary illustration of an automobile bumper 11. The bumper is provided with any of the standard types of trailer clamps 12 carrying a towing ball 13. The trailer illustrated is provided with an A-shaped tongue 14 terminating in a ball clamp 15. The tongue 14, however, may be of any standard or suitable design. The ball clamp 15 is also of any of the usual types at present on the market.

The towing dolly comprises a horizontal frame 16 to which is attached, at each side extremity thereof, a pair of cantilever springs 17 by means of suitable spring clamps 18. The springs 17 extend rearwardly and downwardly and at their free extremities surround a cross axle 19. The axle 19 carries suitable ground wheels 20, there being one wheel between each pair of the springs 17. The wheels may be provided with suitable mud fenders 48.

A tongue member 21 extends forwardly from the trailer frame. The rear extremity of the tongue member is secured to an adjustable cross member 61 which is bolted at its extremities, by means of suitable bolts 62, into any desired ones of a plurality of bolt holes 63. The tongue member is secured to the frame 16 by means of a clamp member 22. By this arrangement, the tongue member may be adjusted forwardly and backwardly and clamped in any desired projecting position. The forward extremity of the tongue member 21 terminates in a ball clamp 23 of any suitable design to engage the towing ball 13.

A vertical channel member 31 is secured to the rearward extremity of the tongue member 21 by means of angle clips and suitable clamp bolts 25 and 32. A horizontal lower shelf plate 24 projects rearwardly from the channel member 31. The height of the shelf plate with relation to the tongue member 21 is adjustable since the bolts 32 pass through slotted openings in the angle clips which, when the bolts are loosened, allow the channel member 31 to be raised or lowered. The shelf plate 24 carries a second towing ball 26 upon which the ball clamp 15 of the trailer is engaged. The vertical adjustment of the shelf plate 24 is for the purpose of accommodating different heights of trailer tongues. The horizontal adjustment of the tongue member 21 allows the ball 26 to be positioned in any desired vertical relation with the cross axle. Ordinarily, it is positioned directly above this axle.

It can be readily seen that, as thus far described, the dolly forms what might be termed guide wheels for the trailer. Should the towing vehicle be turned to one side, it will first cause a rotation in the ball clamp 23 and as the vehicle continues on an arc it will swing the entire dolly causing rotation in the ball clamp 15. The dolly will then follow the towing vehicle and the trailer will follow the path of the dolly.

Under actual road conditions, however, and at high speeds the reactions of the trailer and dolly are out of phase with, that is they do not coincide with, the movements of the towing vehicle so that the trailer is endeavoring to turn to the side after the towing vehicle has attempted to resume its straight-ahead direction.

This creates a multiplying whipping action which may eventually reach an intensity sufficient to throw the dolly to one side of the road. A multiplying vertical pitching action may also be created at the dolly due to road irregularities causing a surging movement of the trailer.

These undesirable actions and reactions are, in the improved dolly, dampened and eliminated by means of a horizontal double-acting shock absorber 27 and a vertical shock absorber 28. The inner construction of these shock absorbers form no part of this invention. They are of the standard type used on trucks and automobiles to dampen the spring reactions in both directions to prevent bouncing of the vehicle. Such absorbers impart a dampening or retarding action to a built-in absorber shaft 29 which projects therefrom.

The horizontally acting shock absorber 27 is secured on an upper horizontal plate 30 by means of clamp bolts 33. The plate 30 projects rearwardly from the top of the vertical channel 31 so as to be vertically adjustable with the lower plate 24. The attachment of the absorber, is such as to position the vertical axis of its absorber shaft 29 in vertical alignment with the vertical axis of the ball 26. The shock absorber shaft 29 carries an absorber lever 64 which is bolted to a yoke member 34 by means of suitable bolts 35.

The yoke member 34 extends completely over the absorber 27 terminating in two downwardly turned legs 36 which support a forwardly extending, arcuate bar 37. An absorber rod 38 extends rearwardly and outwardly from each of the legs 36. The rods 38 terminate in hinged connections on attachment plates 41. The hinge points are cushioned by means of rubber cushion blocks 43. The attachment plates 41 are secured to the extremities of a cross bar 39. The cross bar is in turn secured to the trailer tongue 14 by means of suitable U-clamps 42.

It can be readily seen that if any attempt is made to quickly rotate the dolly around the axis of the ball 26, it will be resisted by the shock absorber 27 since its operating lever 64 is secured to the yoke 34 which in turn is rigidly braced through the rods 38 from the trailer. Therefore it is impossible for either the dolly or the trailer to make a quick swing to either side of the towing ball 12. Should the trailer attempt to whip or swing with reference to the dolly, this swinging action will be communicated through the rods 38 to the yoke member 34 and from thence to the absorber shaft 29. The absorber 27 resists rapid rotation of the shaft since it is fixedly secured to the dolly.

Therefore, it is impossible for any rapid swinging or whipping action to take place in a horizontal plane yet the normal steering movements are not interfered with.

The absorber 28 is designed for dampening downward and forward vibrations of the axle 19 to eliminate bouncing or pitching movements. This absorber is secured on an angle plate 43 which in turn is secured below the cross bar 39 by means of suitable clamp screws 44. The absorber shaft 29 of this absorber carries a lever 45 which is connected to the axle 19 by means of a turn buckle rod 46 which is provided with a suitable turn buckle 47 for length adjustment.

It can be readily seen that due to the cantilever construction of the springs 17, the axle 19 will move in an arc about the spring clamps 18 so that when the dolly frame moves downwardly, the axle 19 will be pushed rearwardly and conversely when the dolly frame moves upwardly, the axle will be pulled forwardly. These forward and back pitching or surging movements are resisted by the reaction of the shock absorber 28 so that it is impossible to build up a dangerous reaction.

The tongue member 21 is provided with a vertical clamping sleeve 49 having a suitable set screw 50, a vertical leg rod (not shown) can be set in this clamping sleeve to support the tongue member when the latter is not attached to a towing vehicle. The cross bar 39 is also provided with a vertical sleeve 51 in which a post, indicated in broken line at 52, may be set. The post is provided with an adjustable hook bar, indicated at 53, which hooks into an eye bolt 54 in the top of the yoke 34. This mechanism is also for supporting the tongue member 21 when it is not attached to a towing vehicle and when the previously mentioned leg bar is not used.

The arcuate bar 37 is provided at its opposite sides with adjustable stop lugs 55. These lugs are secured to the arcuate bar by means of clamp screws 56 passing through slotted openings 57 in the bar so that their position thereon may be adjusted. The channel 31 supports a latch member 58 which when the dolly is rotated to its extreme positions strikes the lugs 55 and prevents further rotation. This prevents damage to the shock absorber mechanism 27 and also prevents cramping of the dolly wheels beneath the tongue 14.

The latch member 58 is perforated and its perforation aligns with a pin hole 59 extending through the arcuate bar 37. If a pin, such as indicated in broken line at 60, be inserted through the pin hole into the perforation in the latch member, it will lock the arcuate bar from movement so that the wheel axle 19 cannot turn with reference to the tongue 14. This arrangement is used where it is desired to back the trailer by reversing the tow car and prevents the dolly from swinging to either side during the backing operation.

It is desired to call particular attention to the method of attaching the springs 17 to the vehicle. The clamps 18 are secured to the frame by means of two simple bolts 65. The springs slide freely from the axle 19. Therefore to remove either wheel it is only necessary to remove the spring clamp 18 at that side of the frame and pull the spring from the axle. The springs can be quickly and easily removed from their clamps 18 by simply loosening a single set screw 66. The spring leaves are clamped together by means of a single clamp bolt 67 the head of which projects above the top leaf. The clamped extremity of the spring is inserted into a box on the spring clamp. This box has an opening in its top for receiving the head of the clamp bolt 67. By tightening the set screw 66, the spring is forced upwardly in its box until the bolt head enters this opening to lock the spring in place, as shown in Fig. 8. A set collar 68 of special design prevents endwise movement of the axle but allows a limited rotary movement to prevent twisting thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A towing dolly for trailers comprising: a frame; wheels supporting the frame; a towing tongue extending forwardly of the frame; a towing pivot member carried by the frame above said wheels for receiving the tongue of a trailer; a shock absorber positioned above said pivot member and connected to said frame; an absorber shaft extending from said absorber; and means for connecting the absorber shaft to the trailer.

2. A towing dolly for trailers comprising: a frame; wheels supporting the frame; a towing tongue extending forwardly of the frame; a towing pivot member carried by the frame above said wheels for receiving the tongue of a trailer; a shock absorber positioned above said pivot member and connected to said frame; an absorber shaft extending from said absorber; a cross bar; means for attaching the cross bar transversely of the tongue of a trailer; and shock absorber rods extending from the opposite extremities of the cross bar to an operative connection with the shock absorber shaft.

3. A towing dolly for trailers comprising: a frame; wheels supporting the frame; a towing tongue extending forwardly of the frame; a towing pivot member carried by the frame above said wheels for receiving the tongue of a trailer; a shock absorber positioned above said pivot member and connected to said frame; an absorber shaft extending from said absorber; a cross bar; means for attaching the cross bar transversely of the tongue of a trailer; shock absorber rods extending from the opposite extremities of the cross bar to an operative connection with the shock absorber shaft; a second shock absorber mounted on said cross bar; a lever controlled by said second shock absorber and positioned to rotate in a vertical, longitudinal plane; and a connecting rod extending from said lever to said wheels to dampen the vertical reactions thereof.

4. A towing dolly for trailers comprising: a frame; wheels supporting the frame; a towing tongue extending forwardly of the frame; a towing pivot member carried by the frame above said wheels for receiving the tongue of a trailer; a shock absorber carried from said frame; an absorber shaft projecting vertically from said absorber, the rotation of the latter shaft in either direction being dampened by said absorber; a yoke member secured to and supported by said shaft; and means for connecting said yoke member to said trailer so that horizontal rotation of either or both said tongues about said pivot member in either direction will be dampened by said absorber.

5. A towing dolly for trailers comprising: a frame; wheels supporting the frame; a towing tongue extending forwardly of the frame; a towing pivot member carried by the frame above said wheels for receiving the tongue of a trailer; a shock absorber carried from said frame; an absorber shaft projecting vertically from said absorber, the rotation of the latter shaft in either direction being dampened by said absorber; a yoke member secured to and supported by said shaft; means for connecting said yoke member to said trailer so that horizontal rotation of either or both said tongues about said pivot member in either direction will be dampened by said absorber; and means for securing said yoke member to said frame when desired to prevent rotation of said tongues about said pivot member.

6. A towing dolly for trailers comprising: a frame; wheels supporting the frame; a towing tongue extending forwardly of the frame; a towing pivot member carried by the frame above said wheels for receiving the tongue of a trailer; a shock absorber carried from said frame; an absorber shaft projecting vertically from said absorber, the rotation of the latter shaft in either direction being dampened by said absorber; a yoke member secured to and supported by said shaft; a connecting rod extending rearwardly from each side extremity of said yoke; and means for securing said rods to the tongue of the trailer to prevent relative movement between the latter tongue and the yoke.

7. A towing dolly for trailers comprising: a frame; wheels supporting the frame; a towing tongue extending forwardly of the frame; a towing pivot member carried by the frame above said wheels for receiving the tongue of a trailer; a shock absorber carried from said frame; an absorber shaft projecting vertically from said absorber, the rotation of the latter shaft in either direction being dampened by said absorber; a yoke member secured to and supported by said shaft; a connecting rod extending rearwardly from each side extremity of said yoke; a cross bar; means for securing said cross bar transversely of the trailer tongue; and hinge means securing the rearward extremities of said rods to the side extremities of said cross bar.

8. A towing dolly for trailers comprising: a frame; wheels supporting the frame; a towing tongue extending forwardly of the frame; a towing pivot member carried by the frame above said wheels for receiving the tongue of a trailer; a shock absorber carried from said frame; an absorber shaft projecting vertically from said absorber, the rotation of the latter shaft in either direction being dampened by said absorber; a yoke member secured to and supported by said shaft; means for connecting said yoke member to said trailer so that horizontal rotation of either or both said tongues about said pivot member in either direction will be dampened by said absorber; and limiting stop means for stopping relative rotation between said frame and said trailer tongue at pre-set points.

9. A towing dolly for connecting a trailer tongue to a tow car comprising: a wheeled frame; a tongue projecting forwardly from said frame; means for adjustably securing said tongue to said frame at any desired degree of projection; a first supporting member carried by said tongue above said wheels; a towing ball carried by said first supporting member and pivotally supporting said tongue; a second supporting member carried by said tongue above said ball; a horizontally positioned shock absorber carried by said second supporting member; an absorber shaft projecting vertically from said absorber over the axis of said ball; a transversely extending yoke member secured to said shaft; a transversely extending cross bar fixedly secured with reference to said trailer; and connecting rods extending between the respective extremities of said cross bar and said yoke member.

10. A dolly for connecting a trailer to a towing vehicle comprising: a dolly frame; cantilever springs secured to said frame and extending rearwardly and downwardly therebeneath; a cross axle supporting the free extremities of said springs and extending transversely of said frame; a towing ball for pivotally receiving the tongue of a trailer carried by said frame above said axle; means for securing said frame to a towing vehicle; a shock absorber; means for securing said shock absorber to the trailer; a lever projecting from and dampened by said absorber and positioned to swing in a vertical plane; and a connecting rod securing said lever to said axle to dampen the forward and back and vertical movements of the axle.

ERNEST C. McDANIEL.